US011054601B2

(12) United States Patent
Arol et al.

(10) Patent No.: US 11,054,601 B2
(45) Date of Patent: Jul. 6, 2021

(54) OPTICAL FIBER INTERCONNECT MANAGEMENT

(71) Applicant: Xenoptics IP Holdings Pty Ltd., Clayton South (AU)

(72) Inventors: Joseph Arol, Kiryat-Ono (IL); Zohar Avrahami, Petach Tikva (IL); Solomon Sokolovsky, Glen Iris (AU); Sopit Nondjuy, Chiangmai (TH); Patcharin Jaikaew, Chiangmai (TH)

( * ) Notice: Subject to any disclaimer, the term of this patent is extended or adjusted under 35 U.S.C. 154(b) by 0 days.

(21) Appl. No.: 16/827,010

(22) Filed: Mar. 23, 2020

(65) Prior Publication Data
US 2020/0218025 A1 Jul. 9, 2020

Related U.S. Application Data

(63) Continuation of application No. 16/495,413, filed as application No. PCT/IL2018/050324 on Mar. 21, 2018, now Pat. No. 10,620,394.

(60) Provisional application No. 62/474,110, filed on Mar. 21, 2017.

(51) Int. Cl.
G02B 6/44 (2006.01)
G02B 6/35 (2006.01)
G02B 6/38 (2006.01)

(52) U.S. Cl.
CPC .......... *G02B 6/4457* (2013.01); *G02B 6/35* (2013.01); *G02B 6/3508* (2013.01); *G02B 6/3564* (2013.01); *G02B 6/3807* (2013.01); *G02B 6/3897* (2013.01); *G02B 6/447* (2013.01)

(58) Field of Classification Search
CPC ...... G02B 6/35; G02B 6/3508; G02B 6/3548; G02B 6/3564; G02B 6/38; G02B 6/3822; G02B 6/3825; G02B 6/3845; G02B 6/3885; G02B 6/3886; G02B 6/389; G02B 6/3895; G02B 6/3897; G02B 6/4227; G02B 6/4249; G02B 6/4457; G02B 6/447
USPC ............................................. 385/16, 53, 135
See application file for complete search history.

(56) References Cited

U.S. PATENT DOCUMENTS

2010/0316334 A1* 12/2010 Kewitsch ............... H04Q 1/145
385/78

* cited by examiner

*Primary Examiner* — Michael P Mooney
(74) *Attorney, Agent, or Firm* — A.C. Entis-IP Ltd.; Allan C. Entis

(57) ABSTRACT

Apparatus for establishing optical connection between optical fibers, the apparatus comprising: a first array comprising a plurality of slack management units (SMU), each having a holding socket for holding an optical end connector of an optical fiber and configured to reel in a length of fiber released when the optical end connector is removed from the holding socket; a second array comprising a plurality of coupling sockets, each configured to hold an optical end of an optical fiber; and a pick and place grabber controllable to grab an optical end connector seated in a holding socket of any SMU in the first array, move the optical end connector into any coupling socket in the second array to establish an optical connection between the optical fiber connected to the optical end connector, and an optical end of an optical fiber held in the coupling socket; at least one identification (ID) tag; an ID reader operable to interrogate each of the at least one ID tag; a controller configured to control the ID reader to interrogate an ID tag of the at least one ID to identify an optical end connector in the first array and/or a coupling socket in the second array.

11 Claims, 12 Drawing Sheets

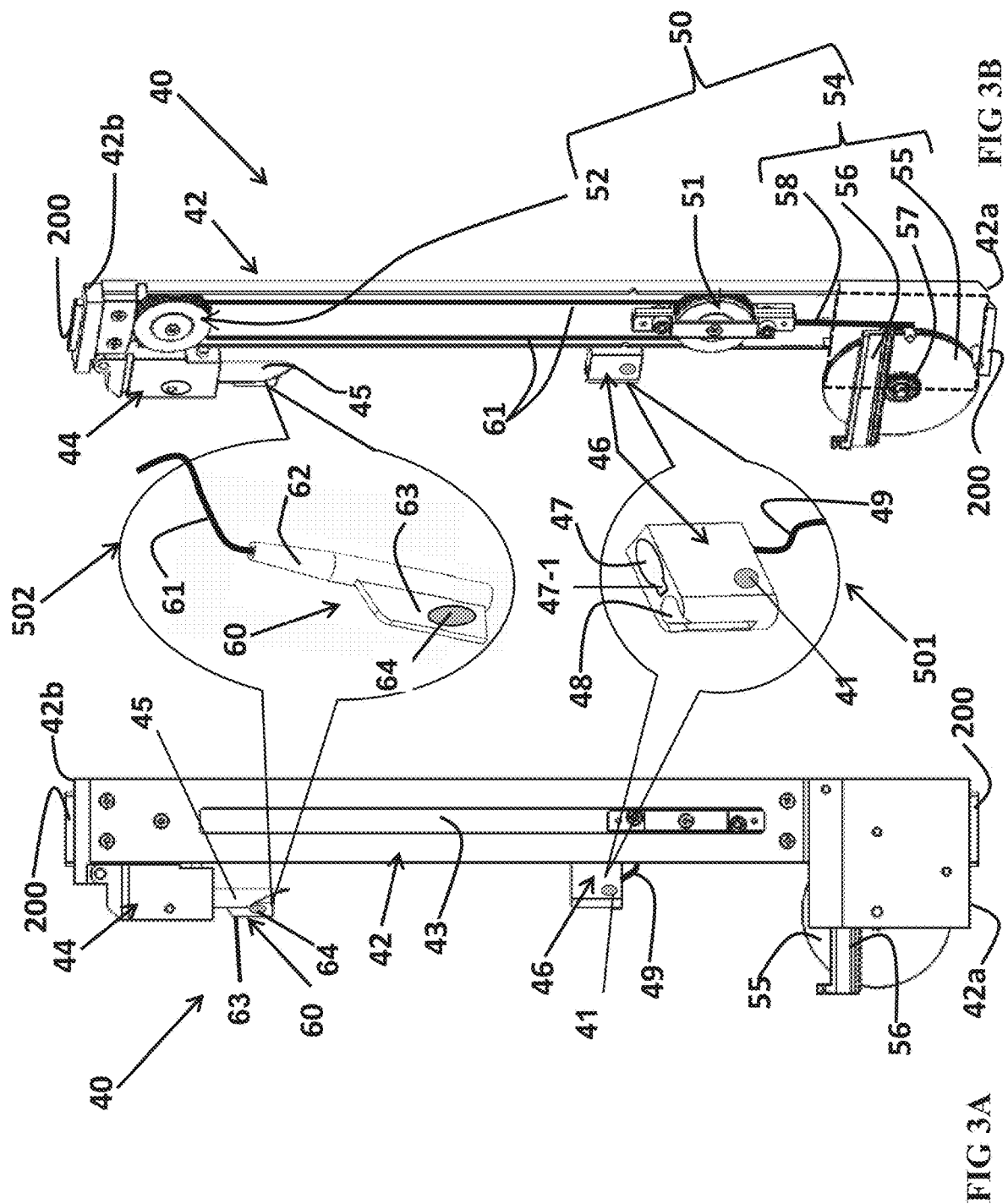

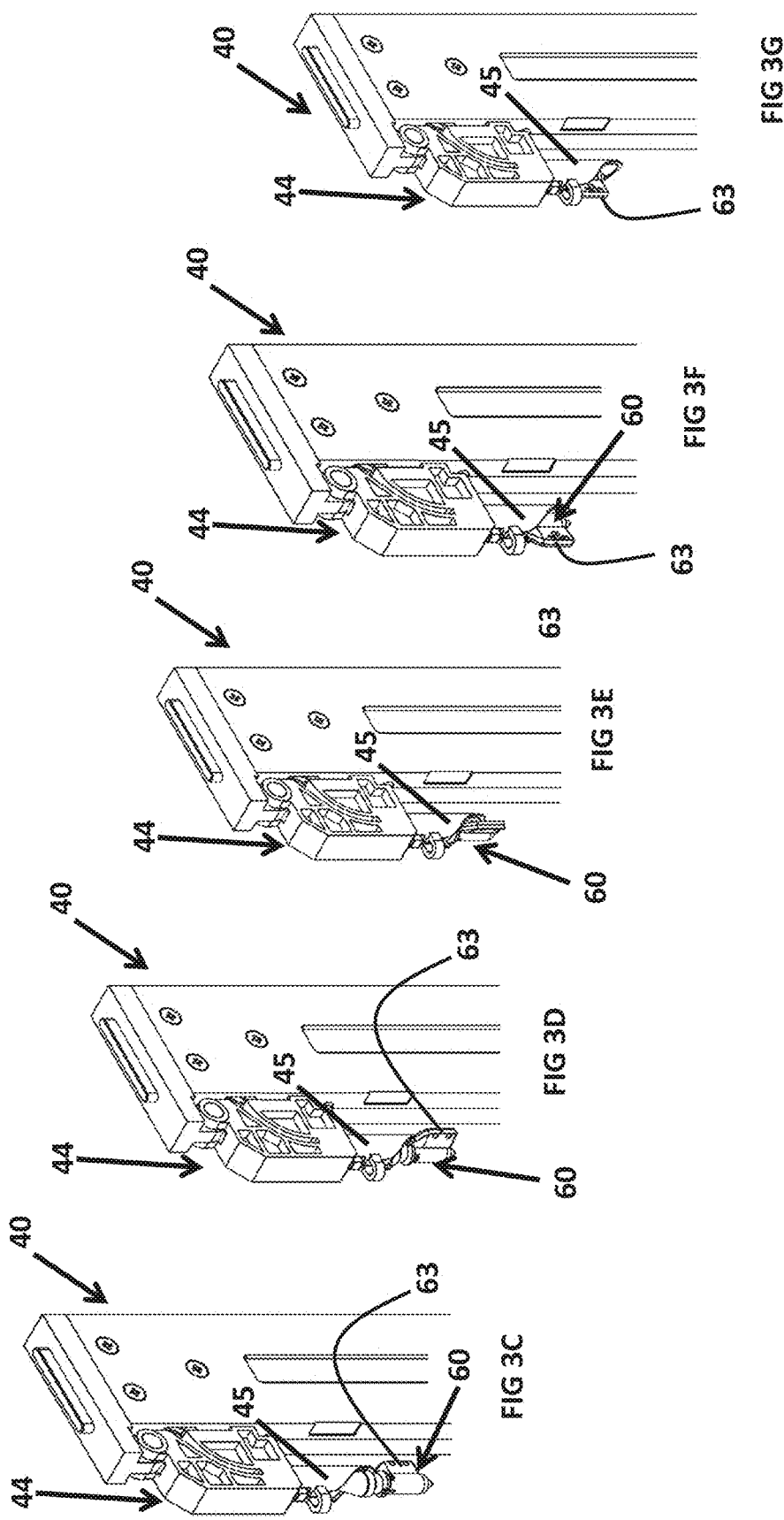

OPTICAL FIBER INTERCONNECT MANAGEMENT

RELATED APPLICATIONS

The present application is a continuing application of U.S. patent application Ser. No. 16/495,413, filed on Sep. 19, 2019, which is a PCT National Phase of PCT/IL2018/050324 filed on Mar. 21, 2018, which claims benefit under 35 U.S.C. 119(e) of U.S. Provisional Application 62/474,110 filed Mar. 21, 2017, all the disclosures of which are incorporated herein by reference.

BACKGROUND

Modern communication networks engage in frantic connect and disconnect operations of large numbers of signal bearing optical fibers to route communication signals from their sources to their destinations. Connecting and disconnecting the fibers is a complex operation that not only has to be done quickly and reliably but must contend with controlling slack in fibers being connected and disconnected, preventing them from getting entangled with each other, and is advantageously performed in a relatively small volume by compact equipment that can readily be serviced.

SUMMARY

An aspect of an embodiment of the disclosure relates to providing a compact optical fiber interconnect management unit (FIMU) configured to automatically connect an optical end (OE) of any one of a first plurality of first fibers to an OE of any one of a second plurality of second fibers relatively rapidly while managing fiber slack and controlling fiber entanglement of the first fibers.

In an embodiment a FIMU comprises a slack management unit (SMU) for each of the first fibers that has a first socket, hereinafter also referred to as a "holding socket", into which an optical end connector of the first fiber may be seated and securely held when the first fiber is not connected to a second fiber. The SMU also, optionally, comprises a second socket, hereinafter also referred to as a "coupling socket", to which an OE of a second fiber is connected of the second plurality of optical fibers. In an embodiment, FIMU comprises a pick and place grabber, a reel-in actuator, and a rotator operable to rotate the grabber and/or the reel-in actuator through an azimuth angle about an axis of rotation. In an embodiment, FIMU comprises a platform, also referred to as an "elevator platform", or "elevator" to which the grabber is mounted and which is operable to translate the grabber selectively along the rotator rotation axis in directions referred to as "up" and "down". FIMU comprises a controller configured to control components of FIMU to connect any first fiber to any second fiber by plugging the optical end connector of the first fiber into the coupling socket of the second fiber and to disconnect a first fiber connected to a second fiber by unplugging the optical end connector of the first fiber from a coupling socket of a second fiber into which it has been plugged. FIMU has a fiber-free zone and a fiber occupation zone. Lengths of first fibers connected to second fibers are generally present in the fiber occupation zone but are absent from the fiber-free zone.

In an embodiment, to connect a first fiber to a given second fiber, the controller controls the rotator and/or elevator and grabber to grab the optical end connector of the first fiber, remove the optical end connector from its holding socket, move it through the fiber-free zone, and plug the end connector into the coupling socket of the second fiber. To disconnect the first fiber from the second fiber the controller controls the elevator, rotator, and grabber to remove the end connector of the first fiber from the coupling socket of the second fiber and, after removal, control the reel-in to reel in the fiber until the end connector is pulled into and seats in the holding socket of the first fiber.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF FIGURES

Non-limiting examples of embodiments of the disclosure are described below with reference to figures attached hereto that are listed following this paragraph. Identical features that appear in more than one figure are generally labeled with a same label in all the figures in which they appear. A label labeling an icon representing a given feature of an embodiment of the disclosure in a figure may be used to reference the given feature. Dimensions of features shown in the figures are chosen for convenience and clarity of presentation and are not necessarily shown to scale.

FIGS. 3A and 3B schematically show side and perspective views of a slack management unit (SMU) configured for reeling in and reeling out a first optical fiber and controlling slack during connecting and disconnecting the first fiber to a second fiber, in accordance with an embodiment of the disclosure;

FIGS. 3C and 3G schematically show perspective snapshots of an optical end connector during insertion of the end connector into a holding socket of an SMU, in accordance with an embodiment of the disclosure;

DETAILED DESCRIPTION

Figure 1:
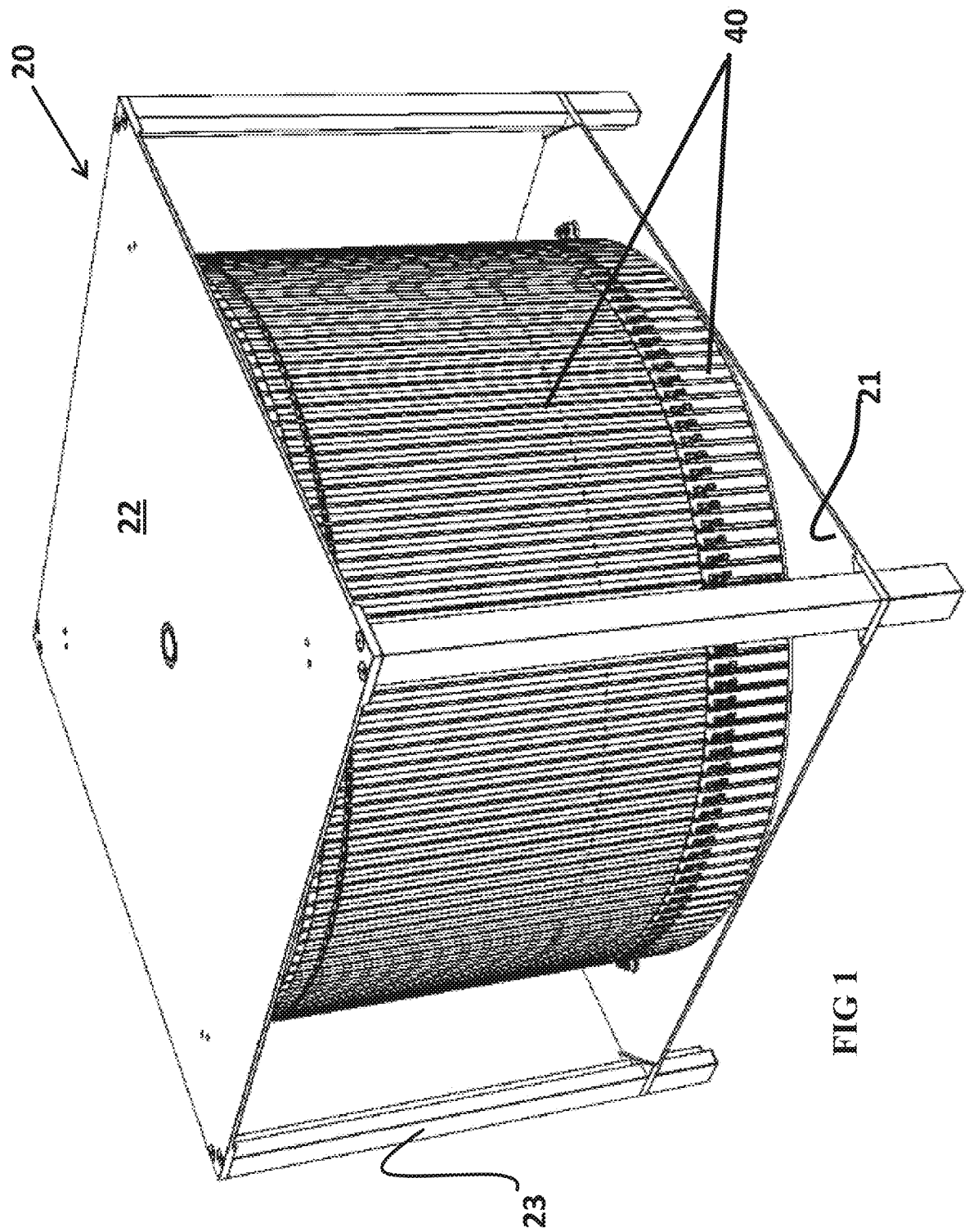
FIG. 1 schematically shows a FIMU comprising a cylindrical array of SMUs in accordance with an embodiment of the disclosure.

In the discussion below features of a FIMU, in accordance with an embodiment of the disclosure are discussed with reference to FIG. 1 which shows an outside perspective view of the FIMU and FIGS. 2A and 2B which show details of components and internal structure of the FIMU. FIGS. 3A and 3B show a single SMU in accordance with an embodiment of the disclosure and details of slack control pulleys, an optical end connector that seats in a holding socket of the SMU and a socket manifold configured having coupling and parking sockets in accordance with an embodiment of the disclosure. Features of internal construction of a rotator and grabber in accordance with an embodiment of the disclosure are discussed with reference to enlarged images of the features provided in FIGS. 4A and 4B. Operation of a FIMU and its components in connecting and disconnecting optical fibers is schematically illustrated in FIGS. 5A-5R and discussed with reference to the figures.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended. Unless otherwise indicated, the word "or" in the description and claims is considered to be the inclusive "or" rather than the exclusive or, and indicates at least one of, or any combination of items it conjoins, FIG. 1 schematically shows a perspective external view of a FIMU 20 in accordance with an embodiment of the disclosure. FIMU 20 optionally comprises bottom and top external cover plates 21 and 22 that support between them an optionally circular array of SMUs 40. The SMUs house optical ends (OE) of optical fibers (not shown) that enter FIMU 20 from a communication network that FIMU 20 services and which FIMU 20 connects and disconnects in various combinations to set up and take down different communication channels that may be required by the network. By way of numerical example, the array of SMUs 40 may comprise 144 SMUs and top and bottom cover plates 21 and 22 may be square, having a side dimension of optionally about 45 cm. The cover plates may be attached together by support struts 23 that separate the plates by about 30 cm.

Figure 2A:
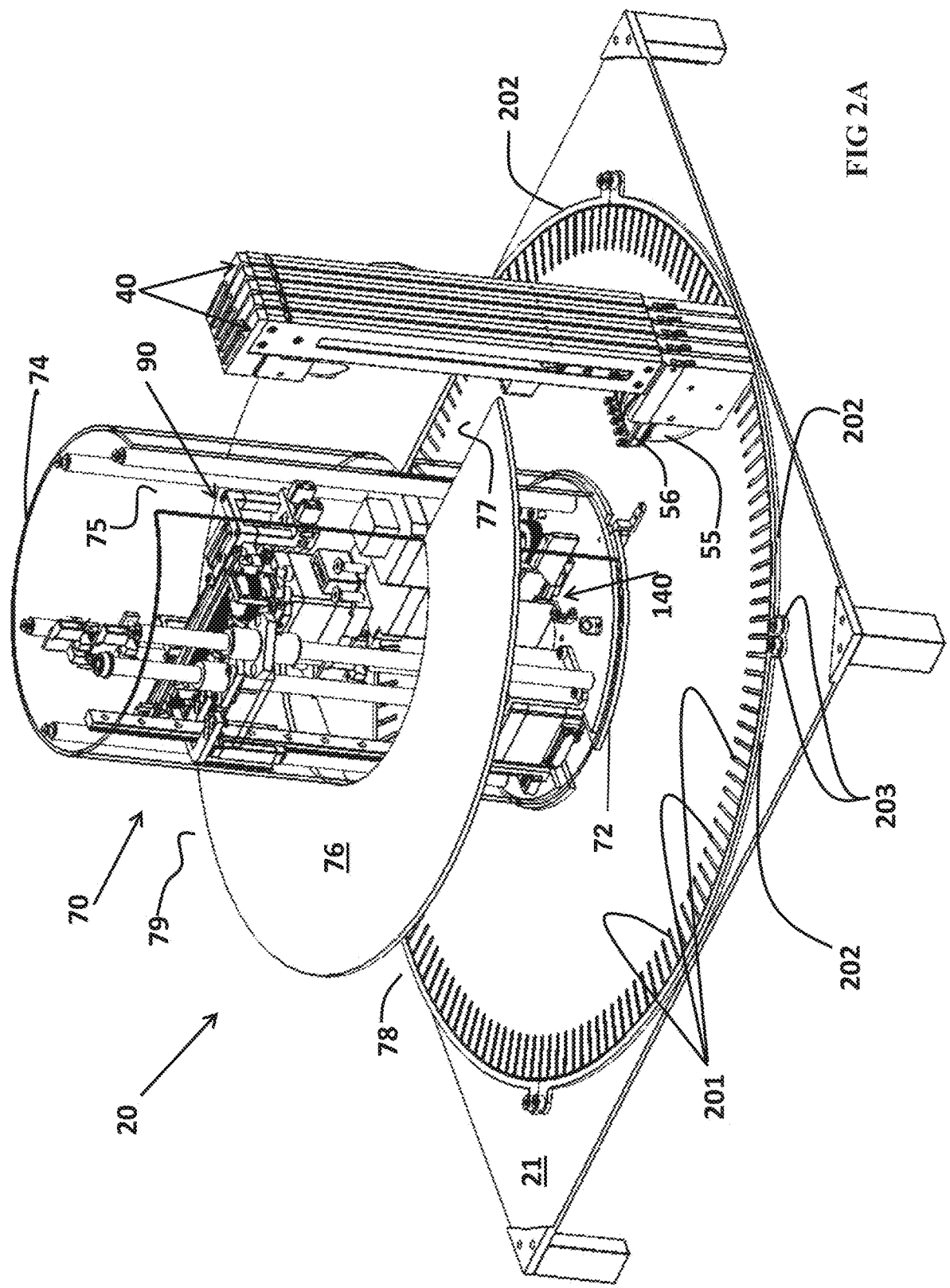
FIGS. 2A and 2B schematically show the FIMU shown in FIG. 1 having most of the SMUs removed to expose the rotator comprised in the FIMU and internal components and structure of the FIMU, in accordance with an embodiment of the disclosure.
Figure 2B:
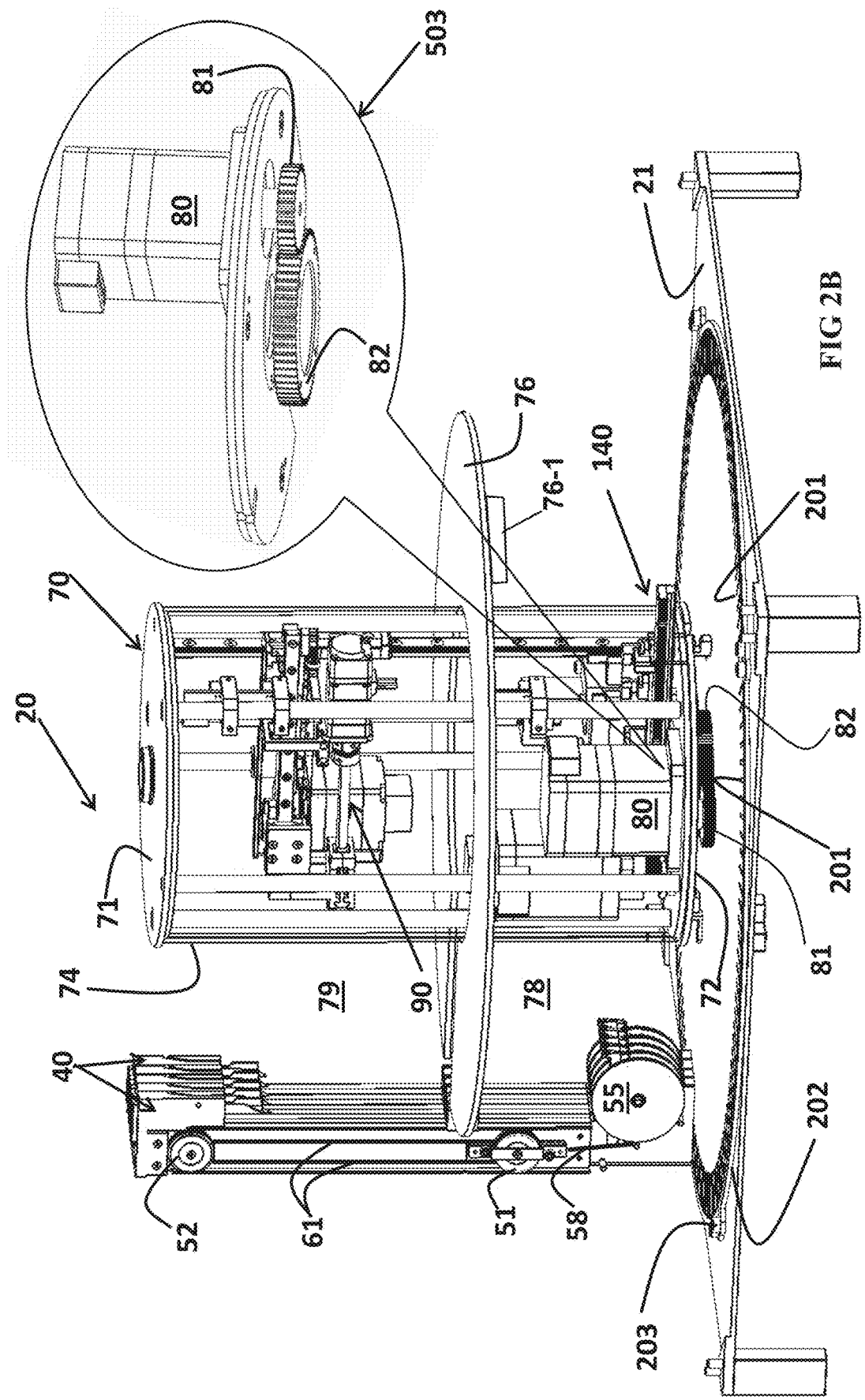

FIGS. 2A and 2B schematically show perspective views of FIMU 20 with top cover plate 22 and most of SMUs 40 removed to show only five SMUs 40 and internal components and structure of the FIMU. FIMU 20 comprises a rotator 70, which houses components that a controller (not shown) of FIMU 20 controls to connect and disconnect optical ends of network optical fibers housed in SMUs 40. The controller may comprise any electronic and/or optical processing and/or control circuitry, to provide and enable functionalities that the FIMU may require to support management of optical fibers connected to FIMU. By way of example, the controller may comprise any one, or any combination of more than one of, a microprocessor, an application specific circuit (ASIC), field programmable array (FPGA) and/or system on a chip (SOC). The FIMU may comprise a memory having any electronic and/or optical circuitry suitable for storing data and/or computer executable instructions and may, by way of example, comprise any one or any combination of more than one of a flash memory, random access memory (RAM), read only memory (ROM), and/or erasable programmable read-only memory (EPROM).

FIGS. 3A and 3B schematically show an enlarged side view and a perspective view respectively of an SMU 40 in accordance with an embodiment of the disclosure. The perspective view in FIG. 3B is partially cutaway and a portion of an external surface of SMU 40 shown in the figure in dashed lines is transparent to show internal components of the SMU.

SMU 40 comprises a housing 42 having mounted thereto a holding socket 44 and a socket manifold 46, shown enlarged in perspective in an inset 501, having a coupling socket 47 and a parking socket 48. An optical communication fiber 49 from a communication network, hereinafter also referred to as a "serviced network", (not shown) that FIMU 20 services is connected to coupling socket 47 so that an optical end connector of another optical communication fiber may be inserted into the coupling socket to establish an optical connection with the fiber connected to the coupling socket. In an embodiment, SMU 40 may comprise at least one radio frequency identification (RFID) tag that identifies the SMU and/or a component of the SMU, such as holding socket 44, socket manifold 46, and/or housing 42, when interrogated by an RFID reader. Optionally, as schematically shown in FIGS. 3A and 3B, SMU 40 comprises an RFID tag 41 mounted on socket manifold 46. For convenience of presentation an optical fiber connected to coupling socket 47 of an SMU in accordance with an embodiment of the disclosure may be referred to as a "stationary fiber". An optical fiber having an optical end connector that can be plugged into and unplugged from coupling socket 47 may be referred to as a "nomad fiber". Functioning of parking socket 48 in socket manifold 46 is described below with reference to FIGS. 5A-5R.

In an embodiment, housing 42 comprises short mounting rails 200 at a bottom 42a and a top 42b of the housing. Mounting rails 200 are matched to slide into SMU mounting grooves 201 optionally formed in or on bottom cover plate 21 and in or on top cover plate 22 (FIG. 1) of FIMU 20. Mounting grooves 201 are schematically illustrated in bottom cover plate 21 shown in FIGS. 2A and 2B. Mounting grooves 201 formed in or on top cover plate 22 (FIG. 1) are, optionally, similar to and may be mirror images of, mounting grooves 201 in bottom cover plate 21. Mounting grooves 201 in bottom cover plate 21 are optionally bounded by one or more, by way of example four, bounding braces 202 (FIGS. 2A, 2B). Each bounding brace 202 may be secured to bottom cover plate 21 by a pair of screws 203.

Bounding braces 202 prevent SMUs 40 mounted in mounting grooves 201 from sliding out from the grooves during operation of FIMU 20. A given SMU 40 in FIMU 20 may easily be replaced by removing a bounding brace 202 securing the given SMU to mounting grooves 201 to which it is mounted, sliding mounting rails 200 of the given SMU out of their respective mounting grooves 201 and sliding a replacement SMU 40 into the mounting grooves vacated by removal of the given SMU. The replacement SMU and other SMUs sharing with the replacement SMU a same bounding brace 202 are secured in their respective mounting grooves 201 by remounting to bottom cover plate 21 bounding brace 202 that was removed to enable replacing the given SMU.

Holding socket 44 is configured to hold an optical end connector 60, shown greatly enlarged in an inset 502, of an optical fiber 61, a "nomad fiber 61", that enters FIMU 20 from a serviced network. Nomad fiber 61 may be reeled in and out of SMU 40 to respectively connect the nomad fiber to, and disconnect the nomad fiber from, a stationary fiber connected to FIMU 20. SMU 40 comprises a slack control system 50 for controlling slack of nomad fiber 61 as optical end connector 60 is removed and pulled out from holding socket 44 to be plugged into a coupling socket 47 of a stationary fiber 49 of an SMU 40 and removed from the coupling socket and reeled back in to be returned to and seat in the holding socket.

Optical end connector 60 optionally has a tapered end 62 to facilitate insertion of the end connector into holding socket 44 and a grab-fin 63 to facilitate holding the optical end connector during connecting and disconnecting the nomad fiber to a stationery fiber. Holding socket 44 optionally comprises a quill shaped receiver 45 that engages and cooperates with grab-fin 63 during insertion of optical end connector 60 into holding socket 44 to automatically, rotationally align the optical end connector with the holding socket. FIGS. 3C-3G show schematic perspective snapshots of optical end connector 60 during insertion of the end connector into a holding socket 44 that illustrate cooperation of grab fin 63 and receiver 45 to rotationally align the optical end connector with the holding socket. In an embodiment, holding socket 44 and optical end connector 60 are configured having respective matching components of a snap connector (not shown) so that the end connector may be held securely when properly seated in the holding socket while enabling convenient removal of the end connector from the holding socket when required for plugging the end connector into a coupling socket.

It is noted that coupling socket 47 is formed having a slot 47-1 configured to engage with and seat grab-fin 63 to align orientation of optical end connector 60 with the holding socket. In an embodiment optical an optical end connector 60 may be connected to a plurality of optical nomad fibers, such as optical fiber 61, and a coupling socket 47 may be connected to a plurality of stationary fibers such as stationary fiber 49. Grab-fin 63 may operate to align optical ends of the plurality of optical nomad fibers connected to optical end connector 60 with optical ends of stationary fibers connected to coupling socket 47 when the optical end connector is plugged into the coupling socket.

Optionally, optical end connector 60 comprises a RFID tag 64 which transmits a unique code that identifies the end connector when interrogated by an RFID reader. RFID tag 64, as schematically shown in FIG. 3A is located on grab fin 63.

Slack control system 50 optionally comprises sliding and stationary pulley blocks 51 and 52 respectively, and a reel-in transmission 54 comprising a reel 55 coupled to a rack 56 and pinion 57. Each pulley block 51 and 52 comprises a plurality of independently rotatable sheaves. Nomad fiber 61 is held in the sheave grooves (not shown) and looped around pulley blocks 51 and 52 so that a plurality of falls of nomad fiber 61 are formed between the pulleys. The falls are schematically represented by lengths of fiber 61 between the pulley blocks. Sliding pulley block 51 is constrained by a slot 43 (FIG. 3A) to freely slide up and down in housing 42. As schematically shown in FIGS. 5A-5R, sliding pulley block 52 slides up to release lengths of nomad fiber 61 when optical end connector 60 of the nomad fiber is pulled out of holding socket 44 and the nomad fiber 61 is reeled out of SMU 40 to reach a coupling socket 47 in FIMU 20 into which the optical end connector is to be plugged. A reelable connector 58, such as a flexible wire, fiber, or filament, generically referred to as a reel-in wire or wire 58, is wound around reel 55 of reel-in transmission 54 and connects reel 55 to sliding pulley block 51. Reeling out a length of nomad fiber 61 to plug optical end connector 60 into a coupling socket 47 unwinds a portion of reel wire 58 from reel 55 and results in rotation of reel 55 that translates rack 56 out from housing 42. Pushing rack 56 back into housing 42 rotates reel 55 to reel in reel wire 58, thereby pulling sliding pulley block 51 down and reeling in the length of nomad fiber 61 reeled out to connect optical end connector 60 to the coupling socket, to reinsert the optical end connector into holding socket 44.

For visual surveying of operation and components of FIMA 20, the FIMA may comprise a camera (not shown) controllable to image features of FIMA and transmit the images to the FIMA controller. Optionally the camera is mounted to grabber 90.

Components of FIMU 20 housed in rotator 70 and shown in FIGS. 2A and 2B are configured to access any SMUs 40 comprised in the FIMU, remove optical end connector 60 of a nomad fiber 61 connected to optical end connector 60 and plug the end connector into a coupling socket 47 of the same or another SMU 40 comprised in the FIMU to connect the nomad fiber to a stationary fiber 49 connected to the coupling socket. Rotator 70 also comprises components operable to remove an optical end connector 60 of a nomad fiber 61 from a coupling socket 47 and engage a reel-in transmission 54 of an SMU to reel in the nomad fiber and return the optical end connector to its holding socket 44.

In an embodiment, rotator 70 comprises top and bottom rotator plates 71 and 72 respectively (FIG. 2B, in FIG. 2A top rotator plate 71 is not shown) and an optionally cylindrical guard shield 74 (FIG. 2A) formed having an access slot 75 through which components housed in rotator 70 may be extended to engage with a SMU 40. As shown enlarged in an inset 503 in FIG. 2B, rotator 70 optionally comprises a motor 80 connected to a planet gear 81 that meshes with a sun gear 82 fixed to FIMU bottom cover plate 21. Motor 80 is controllable to rotate planet gear 81 and thereby rotate rotator 70 and shield 74 so that access slot 75 of guard shield 74 faces a given SMU 40, and a component housed in rotator 70 may engage the given SMU. The rotator may also comprise an optionally annular partition apron 76 formed having a slot 77 aligned with and fixed relative to slot 75 of guard shield 74. As described below, apron 76 divides an internal volume of FIMU 20 into a fiber-free transition zone 78 below apron 76, and a fiber occupation zone 79 above apron 76. As illustrated in FIGS. 5A-5R, as FIMU 20 operates to plug an optical end connector 60 of a nomad fiber 61 into a coupling socket 47 the optical end connector and lengths of nomad fiber 61 to which it is connected are moved through fiber-free transition zone 78. After being plugged into the coupling socket, lengths of the nomad fiber connected to the optical end connector reside in fiber occupation zone 79.

Movement of optical nomad fibers in fiber-free transition zone 7 and fiber occupation zone may generate dust in sufficient quantities to degrade operation of FIMA 20. To detect accumulation of possibly injurious quantities of dust a dust detector 76-1 is optionally mounted to apron 76, optionally on an underside of the apron. In an embodiment if dust detector 76-1 is configured to generate a signal indicating that manual intervention is advised if an amount of detected dust is greater than or equal to a predetermined dust threshold.

Rotator 70 shown in FIGS. 2A and 2B may house a pick and place grabber, hereinafter also a grabber, such as a grabber 90 or 150 shown enlarged in FIG. 4A or FIG. 4B respectively, and a reel-in actuator 140 schematically shown enlarged in FIG. 4A. In FIGS. 2A and 2B a grabber is labeled as grabber 90 for convenience of presentation. Grabber 90 is configured to grab an optical end connector, such as optical end connector 60 (FIGS. 3A, 3B), in accordance with an embodiment of the disclosure, remove it from its holding socket 44 in an SMU 40 and plug it into a coupling socket 47 (FIG. 3A,3B). Grabber 90 optionally comprises grabbing jaws 91, shown enlarged in an inset 504 (FIG. 4A), located at an end 92 of a rack 93 that engages a pinion gear 94. A motor 95 is configured to rotate pinion gear 94 to selectively translate rack 93 in either direction along its length, to move grabbing jaws 91 through access slot 75 to outside of guard shield 74 or to retract grabbing jaws to within the guard shield. Optionally, an overhead motor 101 is configured to control grabbing jaws 91. A shaft (not shown) of overhead motor 101 is coupled to a collar 102, shown in inset 504, of a first geared pivot arm 104 that meshes with a second geared pivot arm 105. Rotation of the shaft that couples overhead motor 101 to first geared pivot arm 104 operates to open or close grabbing jaws 91, which are mounted to a support plate 108 by support arms 109. Rack 93, and pinion gear 94 are mounted to an elevator platform 120 coupled to a threaded drive shaft 121 (threads not shown) that engages with a collar 122 mounted to the elevator platform. Threaded drive shaft 121 is coupled to an elevator motor 124 that is mounted to bottom rotator plate 72 of rotator 70 and controllable to rotate drive shaft 121 to raise or lower elevator platform 120 and thereby grabbing jaws 100. Operation and movement of grabber 90 to plug an optical end connector 60 into a coupling socket 47 and unplug the connector from the socket are discussed with reference to FIGS. 5A-5R below.

In an embodiment, grabber 90 comprises an RFID reader 96 optionally mounted to overhead motor 101 that the FIMU controller controls to interrogate an RFID tag or tags comprised in an SMU and/or a component of the SMU that grabber 90 is operated to engage. For example, RFID reader 96 may be excited to interrogate RFID tag 64 of an optical end connector 60 that the grabber is operated to remove from its holding socket 44 and plug into a desired coupling socket 47 (FIGS. 3A, 3B) to identify the end connector and corroborate that the grabber is engaging the correct end connector. Or RFID reader 96 may be excited to interrogate RFID tag 41 (FIGS. 3A, 3B) of a socket manifold 46 from which grabber 90 is intended to remove an optical end connector 60, to identify the socket manifold and corroborate that it is the intended socket manifold. In an embodiment the controller of FIMU 20 may comprise a memory stored with a real time "connectivity map" of current connections between optical fibers controlled by the FIMU. The controller may control grabber 90 to scan RFID tags in the IFIMU with RFID reader 96 to determine if the connectivity map stored in the controller memory conforms with the actual connectivity configuration, to refresh the connectivity map, and or restore the map in the event of a loss or corruption of data in the map.

In an embodiment, RFID tags comprised in FIMU 20 are configured to respond to an interrogation signal from RFID reader 96 with different delay times so that response signals from RFID tags simultaneously excited by the interrogation signal do not temporally overlap at the reader and interfere with each other. For example, RFID tags 64 of optical end connectors 60 may be configured to respond following a first delay time relative to a time it receives the interrogation signal, while RFID tags 41 of manifold socket 46 may be configured to respond following a second delay time. As a result, if RFID reader 96 is controlled to transmit an interrogation signal to interrogate an optical end connector 60 that grabber 90 is intended to remove from a manifold socket 46 into which the end connector is plugged, signals from RFID tags 64 and 41 in response to the interrogation signal will arrive at the reader in non-overlapping time periods.

In an embodiment, pick and place grabber 90 comprises an optical alignment sensor 111 that provides signals to indicate when the grabber is advantageously aligned with a component of FIMU 20 that the grabber may be intended to engage. Optical alignment sensor optionally comprises a laser 112 and an optical sensor 113 and may, by way of example, be mounted to overhead motor 101. Alignment sensor 111 generates signals indicating that grabber 90 is aligned facing a component of FIMU 20 when optical sensor 113 detects an appropriate intensity or configuration of light from laser 112 that is reflected to the optical sensor by an "alignment reflector" on the component. In an embodiment optical sensor 113 indicates that grabber 90 is advantageously aligned with the component when the optical sensor detects a maximum in the reflected light. In an embodiment optical sensor 113 indicates that grabber 90 is advantageously aligned with the component when the optical sensor detects that different regions of the sensor register substantially same intensities of light from laser 112. An alignment reflector may by way of example be mounted on an optical end connector 60, a holding socket 44, and/or a socket manifold 46.

Figure 4A:
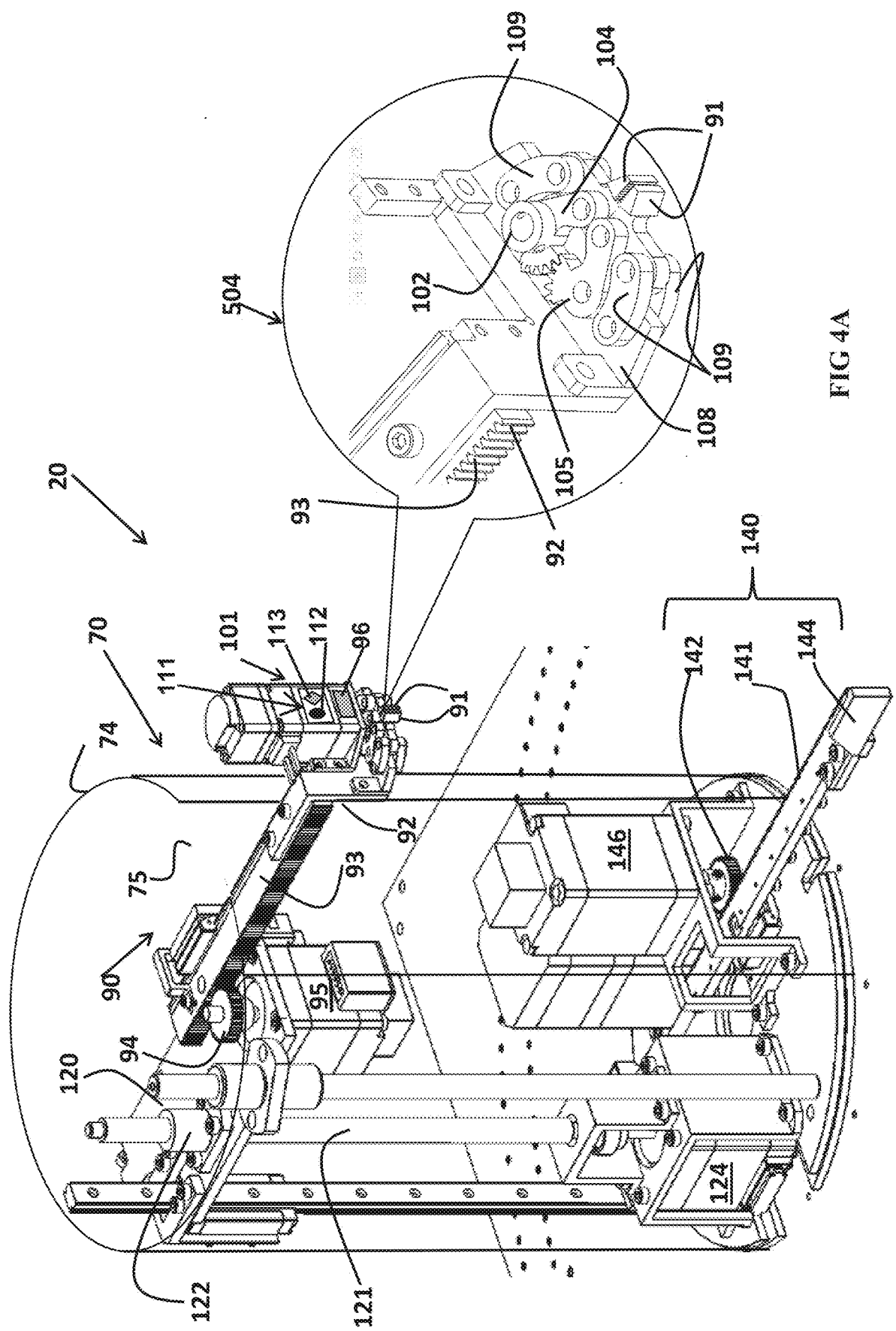
FIG. 4A schematically shows an enlarged image of a rotator of a FIMU similar to that shown in FIGS. 2A and 2B that illustrates spatial relations between components of a rotator, in accordance with an embodiment of the disclosure.
Figure 5A:
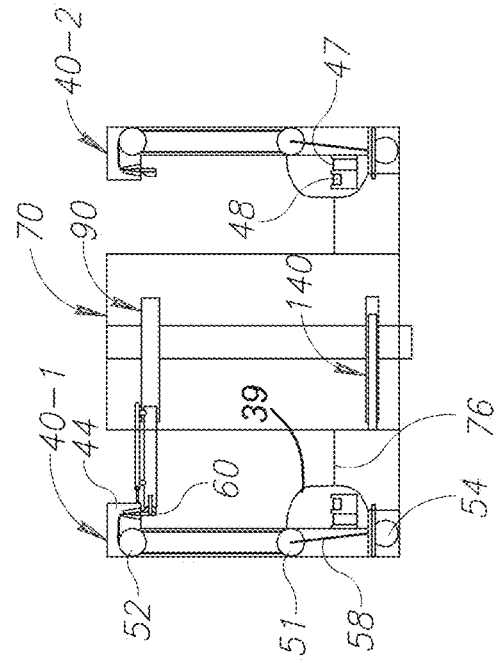
FIGS. 5A-5R schematically show the FIMU shown in FIGS. 1-2B comprising SMUs similar to that shown in FIGS. 3A and 3B operating to connect a first fiber to a second fiber and to disconnect the fibers after connection, in accordance with an embodiment of the disclosure.

Reel-in actuator 140 shown in FIG. 4A optionally comprises a rack 141 and pinion gear 142 and a push block 144 mounted to an end of the rack. Pinion gear 142 is optionally connected to a reel-in motor 146 operable to rotate the pinion gear to translate rack 141 selectively in either direction parallel to its length. FIMU 20 may operate reel-in actuator 140 to reel in an optical end connector 60 of a given nomad fiber 61 unplugged from a coupling socket 47 by controlling rotator motor 80 to rotate rotator 70 so that access slot 75 faces SMU 40 that houses the nomad fiber. FIMU 20 may then operate reel-in motor 146 to extend rack 141 so that push block 144 contacts rack 56 (FIG. 3A, 3B) of reel-in transmission 54 comprised in the SMU and pushes the rack into the SMU so that reel 55 rotates and reels in reel-in wire 58. Reeling in real-in wire 58 lowers sliding pulley 51 and thereby reels in nomad fiber 61 to which the end connector is connected.

Figure 4B:
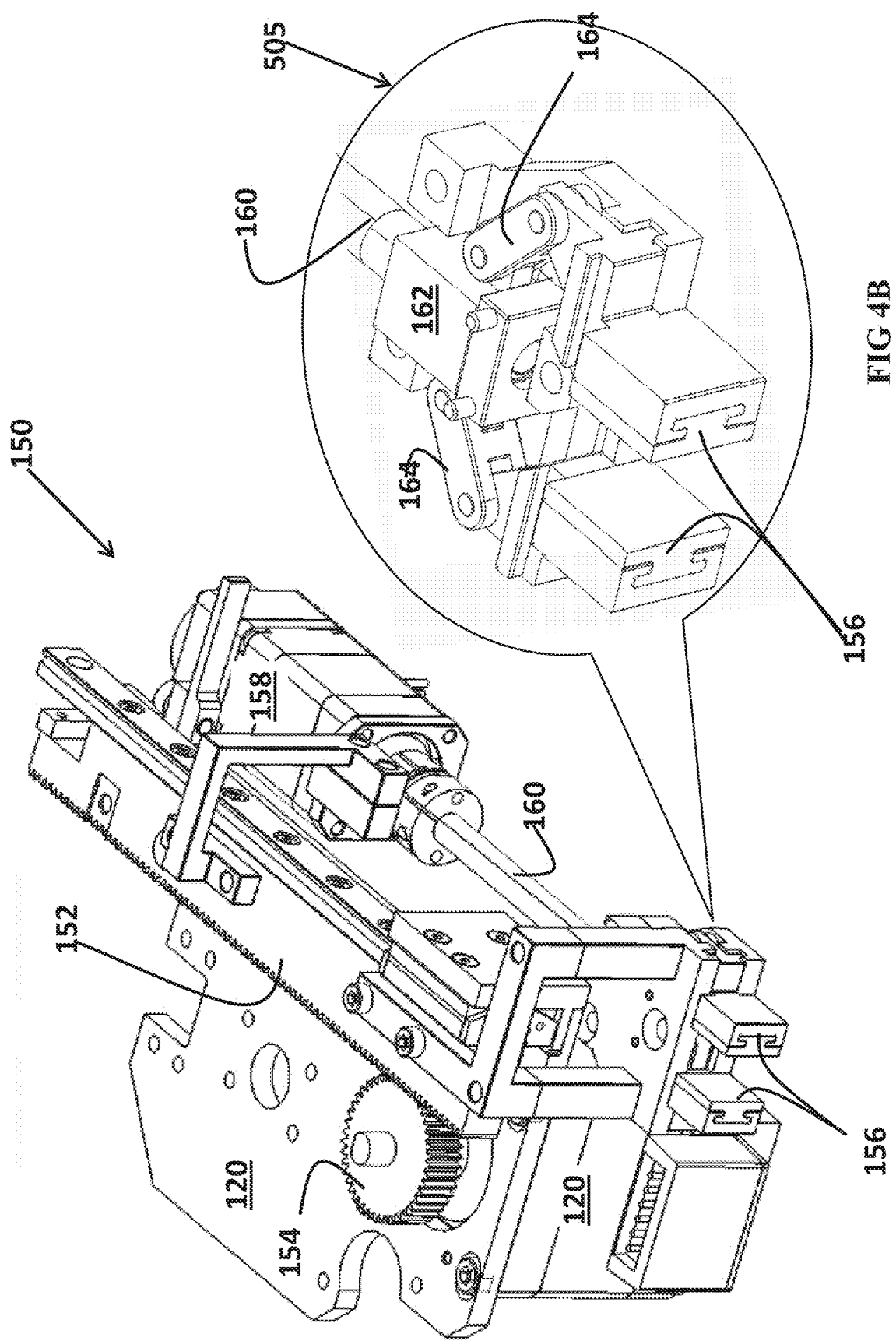
FIG. 4B schematically shows an enlarged image of a pick and place grabber of the FIMU shown in FIGS. 2A and 2B, in accordance with an embodiment of the disclosure.

FIG. 4B schematically shows another pick and place grabber 150 in accordance with an embodiment of the disclosure. Grabber 150 comprises a rack 152 and pinion gear 154 mounted to elevator platform 120. A pair of grabber jaws 156 shown enlarged in an inset 505, and a tandem motor 158 are mounted to and move with the rack. Tandem motor 158 is coupled to grabber jaws 156 by a shaft 160 having a threaded end (not shown) that seats in a sliding block 162 having threads matching the threads at the end of shaft 160. Sliding block 162 is coupled to grabbing jaws 156 by side arms 164. Tandem motor 158 is controllable to rotate shaft 160 to selectively slide sliding block 162 in a direction towards or away from grabbing jaws 156. Motion of sliding block 162 away from grabbing jaws 156 closes side arms 164 towards each other and moves grabbing jaws 156 toward each other to grab an optical end connector 60. Motion of sliding block 162 towards grabbing jaws 156 spreads side arms 164 and moves the grabbing jaws away from each other to release an optical end connector 60 held by the grabbing arms.

It is noted that the location of rotator 70 at a center of FIMU 20 and structure of rotator 70 having its components housed inside a guard shield 74 contributes to ease of servicing of the rotator and rotator components. After removal of top cover plate 22 (FIG. 1) the rotator and/or its components are easily accessed for repair or replacement without having to disconnect any nomad fibers connected to stationary fibers.

Figure 5B:
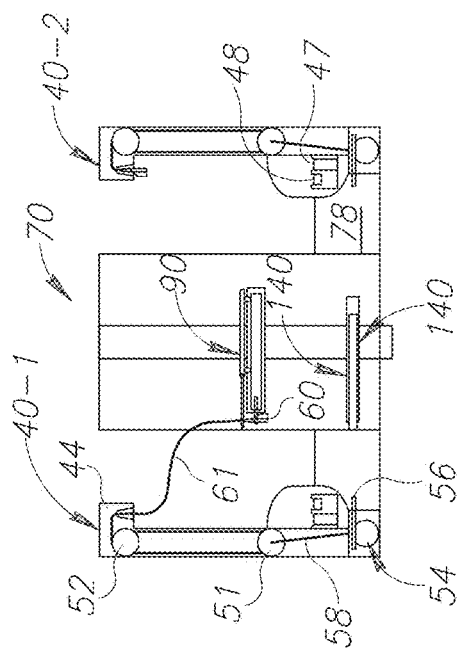
Figure 5C:
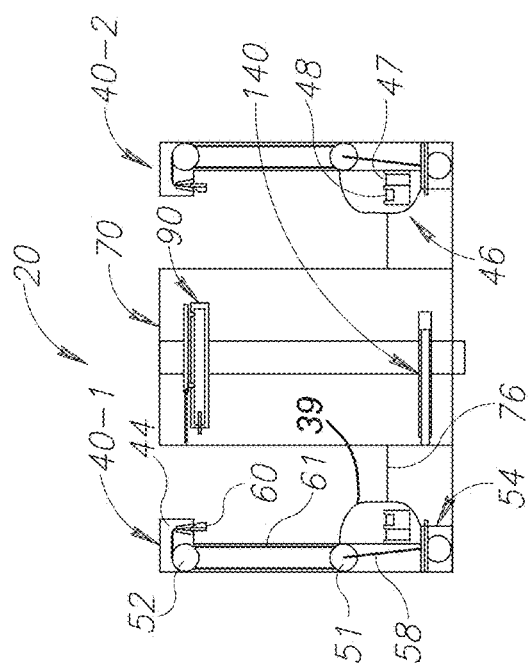
Figure 5D:
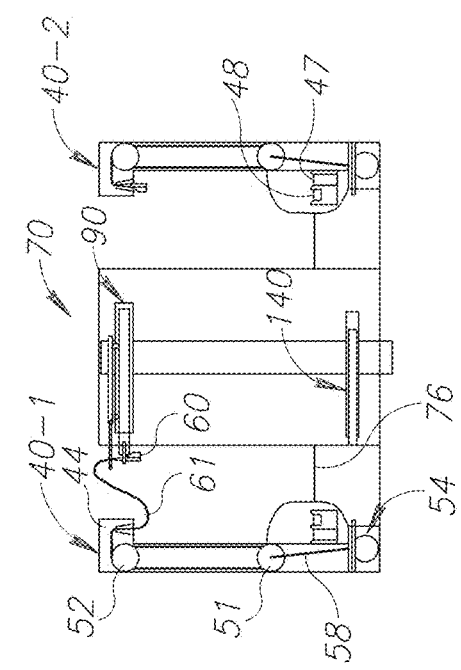
Figure 5E:
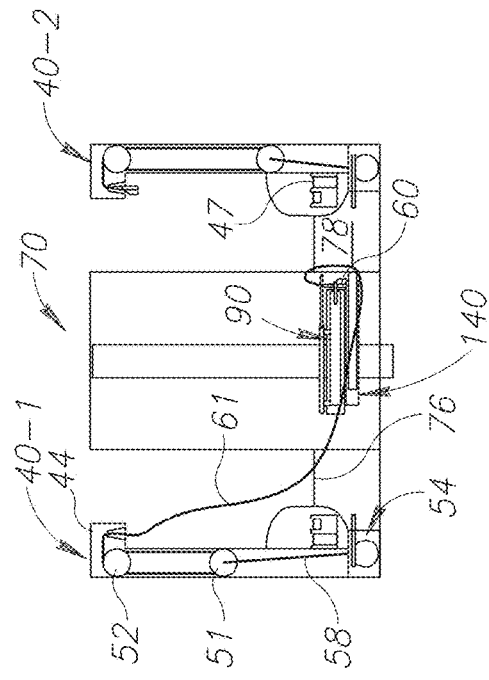
Figure 5F:
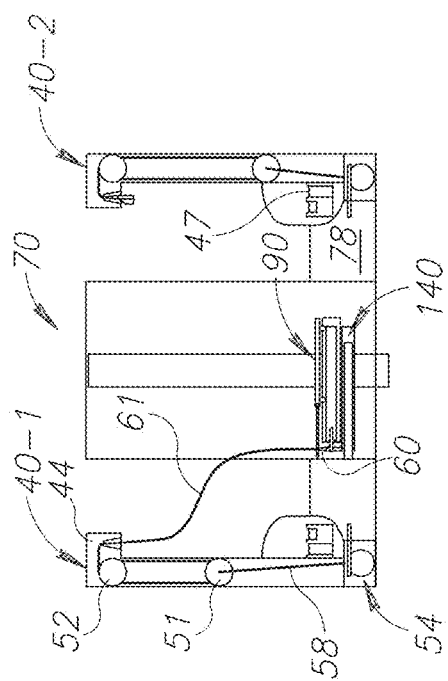
Figure 5G:
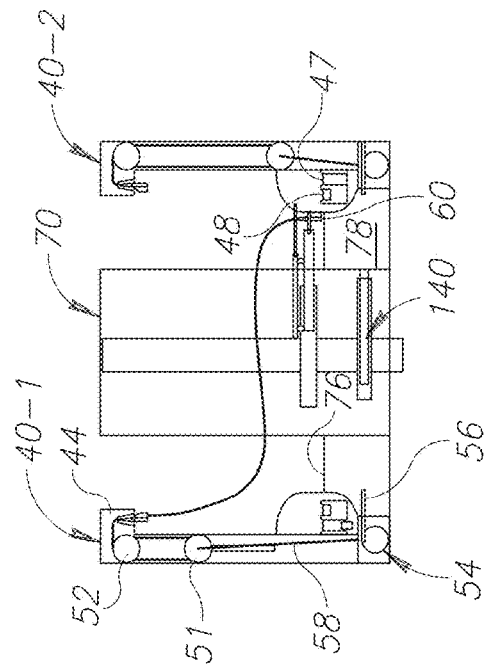
Figure 5H:
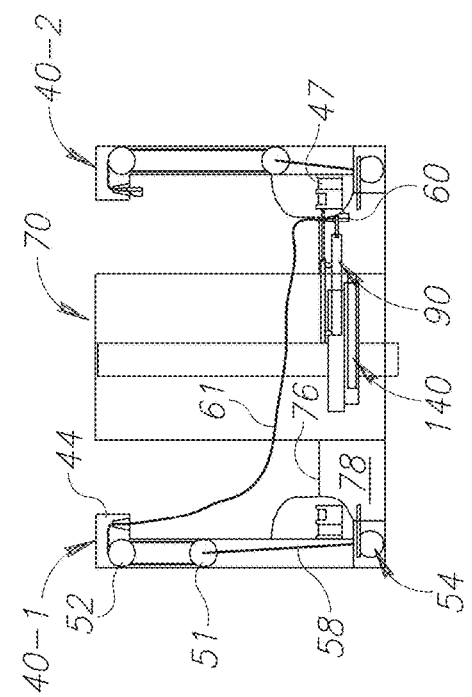
Figure 5I:
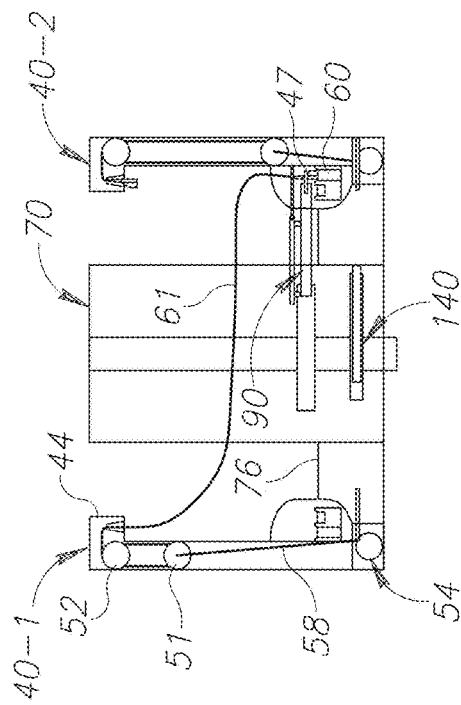
Figure 5J:
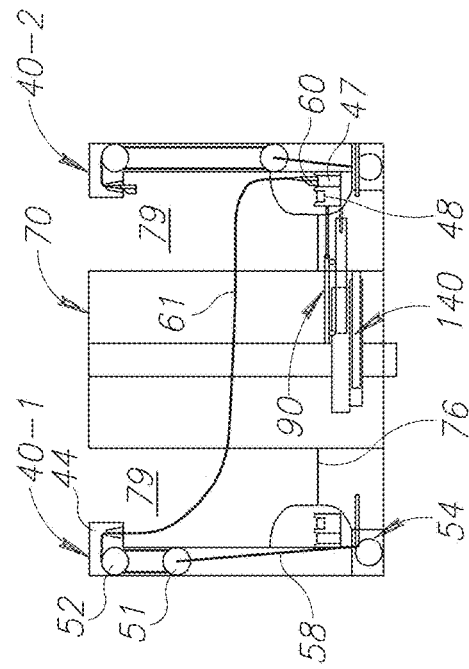
Figure 5K:
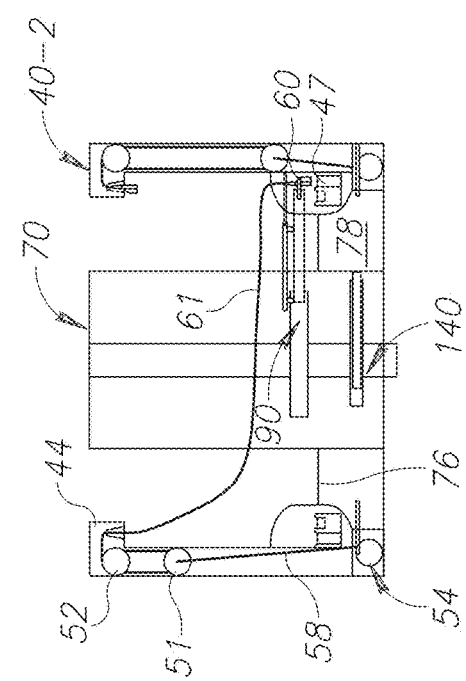
Figure 5L:
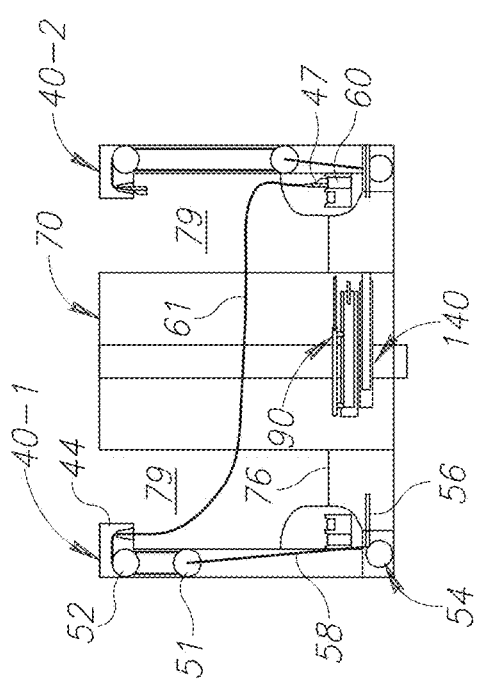
Figure 5M:
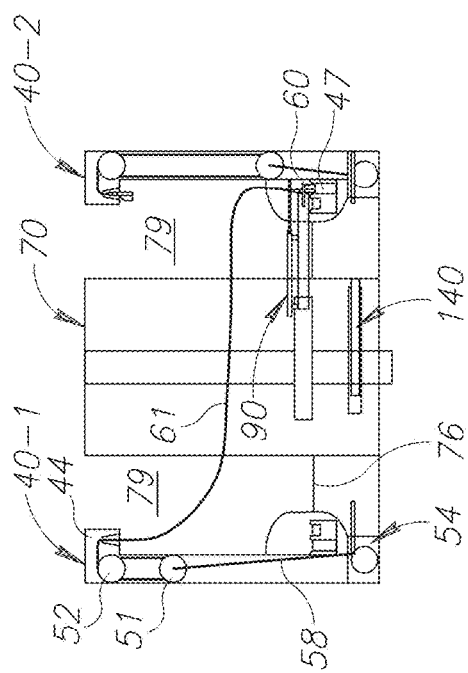
Figure 5N:
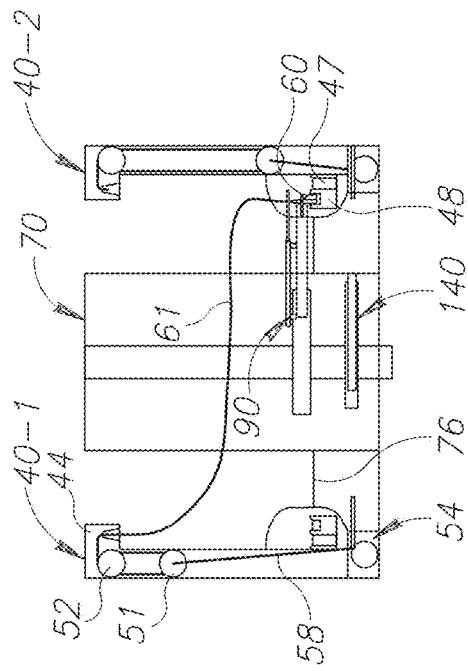
Figure 5O:
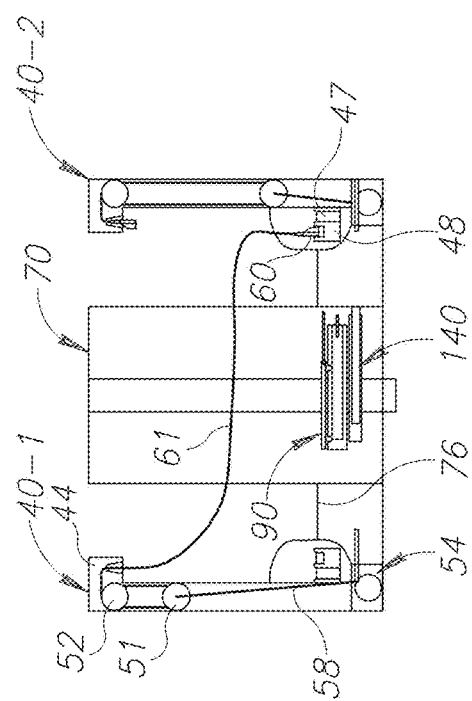
Figure 5P:
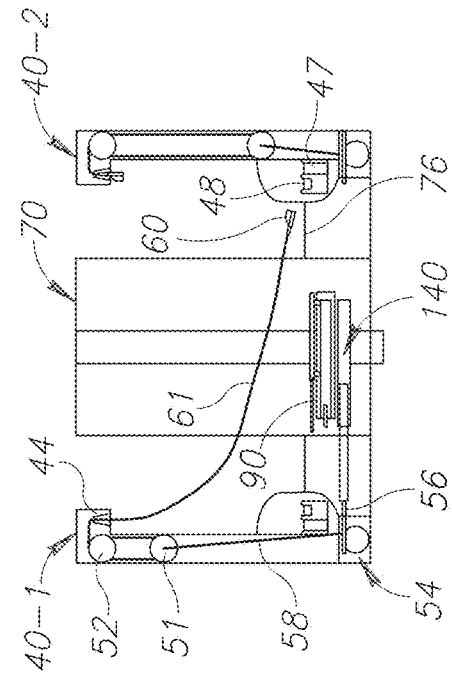
Figure 5R:
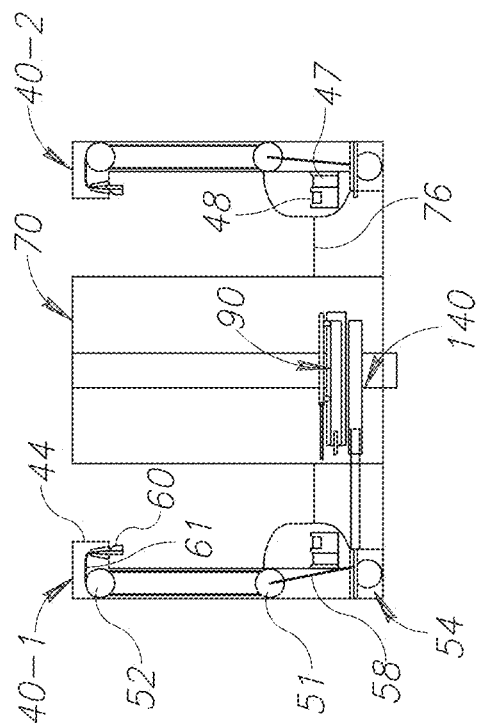

FIGS. 5A-5R very schematically show FIMU 20 operating to plug an optical end connector 60 of a nomad fiber 61 housed in a first SMU 40 labeled 40-1, into a coupling socket 47 of a second SMU 40 labeled 40-1. A feature shown in FIGS. 5A-5R referenced by numeral 39 in FIGS. 5A and 5B represents a wire guard located between SMUs 40 that aids in preventing nomad fibers 61 being disconnected from stationary fibers 49 (FIG. 3A,3B) and reeled into their respective SMUs 40 from lodging behind optical end connectors 60 of other nomad fibers 61 that are plugged into coupling sockets 47.

FIG. 5A shows FIMU 20 after rotator 70 has been rotated so that pick and place grabber 90, hereinafter also referred to as grabber 90, is in a position to be extended from rotator 70 to grab and remove optical end connector 60 from holding socket 44. In FIG. 5B grabber 90 has grabbed optical end connector 60 and in FIG. 5C has removed the end connector from socket 44. In FIG. 5D the grabber has been retracted together with optical end connector 60 that it has grabbed into rotator 70, and is being lowered into fiber-free transition zone 78 below partition apron 76 together with the optical end connector by elevator 120 (FIGS. 4A and 4B). FIG. 5E shows grabber 90 and end connector 60 located in the fiber-free zone. After being lowered beneath partition apron 76, rotator 70 rotates so that as shown in FIG. 5F grabber 90 is located opposite SMU 40-2 having a coupling socket 47 into which optical end connector is to be plugged. It is noted that as shown in FIGS. 5C-5F as grabber 90 pulls optical end connector 60 away from SMU 40-1 and towards SMU 40-2 sliding pulley 51 in SMU 40-1 moves upwards towards stationary pulley 52 of slack control system 50 (FIGS. 3A, 3B) of SMU-1 to reel out need length of nomad fiber 61. As sliding pulley 51 moves up, reel wire 58 unrolls from reel-in transmission 54 of SMU 54-1 (FIGS. 3A, 3B) causing rack 56 of the reel-in move to extend further out from SMU-1.

In FIGS. 5G and 5H grabber 90 extends from rotator 70 and is moved up by elevator 120 past partition apron 76 and into fiber occupation zone 79 in preparation for plugging optical end connector 60 into coupling socket 47 of SMU 40-2. In FIG. 5I grabber 90 has positioned optical end connector 60 over coupling socket 47 and in FIG. 5J has plugged the optical end connector into the socket. After having plugged optical end connector 60 into coupling socket 47 FIMU 20 operates to retract grabber 90 back into rotator 70 leaving any fiber length needed to extend from holding socket 44 of SMU-1 to coupling socket 47 of SMU-2 in fiber occupation zone 79 as shown in FIG. 5K.

FIG. 5L shows FIMU 20 operating to unplug optical end connector 60 from coupling socket 47 in SMU 40-2 and return the optical end connector to holding socket 44 in SMY 40-1. In FIGS. 5L and 5M FIMU 20 raises grabber 90 above partition apron 76 into fiber occupation zone 79, extends the grabber from rotator 70 towards optical end connector 60 and controls the grabber to grab and unplug the optical end connector from coupling socket 47. In FIG. 5N grabber 90 places optical end connector into parking socket 48 and in FIG. 5O retracts back into rotator 70.

Figure 5Q:
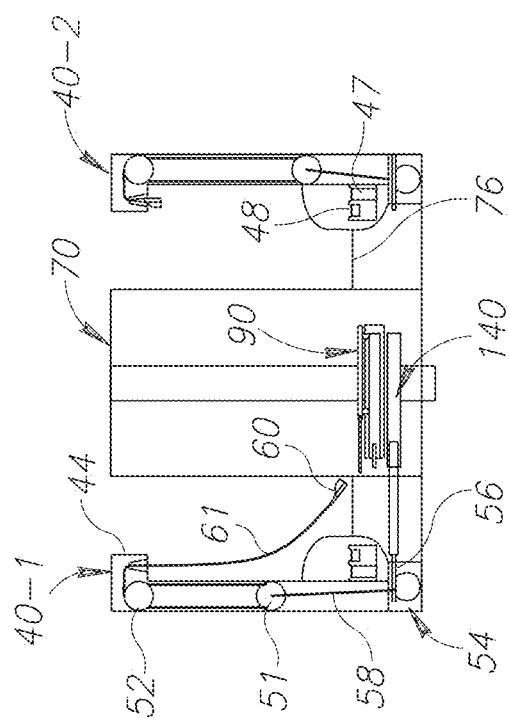

FIMU 20 then controls rotator 70 to rotate back to face SMU 40-1 and in FIGS. 5P and 5Q, controls reel-in actuator 140 to extend and contact rack 56 (FIGS. 3A, 3B) of reel-in transmission 54 and push the extended rack into SMU 40-1. As rack 56 is pushed back into SMU 40-1, reel 55 rotates to roll reel-in wire 58 onto the reel and pull sliding pulley 51 down away from stationary pulley 52. Motion of sliding pulley away from stationary pulley reels nomad fiber 61 into SMU 40-1 until optical end connector 6*o* returns to seat in holding socket 44 of the SMU as shown in FIG. 5R.

It is noted that whereas grabbers and reel-in actuators in accordance with embodiments of the disclosure are described as being driven by motors coupled to geared transmissions, practice of embodiments of the disclosure are not limited to geared transmissions. For example components of a FIMU in accordance with an embodiment, such as FIMU 20 may be driven by piezoelectric motors friction coupled to moving elements of the components.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

Descriptions of embodiments of the disclosure in the present application are provided by way of example and are not intended to limit the scope of the disclosure. The described embodiments comprise different features, not all of which are required in all embodiments. Some embodiments utilize only some of the features or possible combinations of the features. Variations of embodiments of the disclosure that are described, and embodiments comprising different combinations of features noted in the described embodiments, will occur to persons of the art. The scope of the invention is limited only by the claims.

The invention claimed is:

1. Apparatus for establishing optical connection between optical fibers, the apparatus comprising:
a first array comprising a plurality of slack management units (SMU), each having a holding socket for holding an optical end connector of an optical fiber and configured to reel in a length of fiber released when the optical end connector is removed from the holding socket;
a second array comprising a plurality of coupling sockets, each configured to hold an optical end of an optical fiber;
and
a pick and place grabber controllable to grab an optical end connector seated in a holding socket of any SMU in the first array, move the optical end connector into any coupling socket in the second array to establish an optical connection between the optical fiber connected to the optical end connector, and an optical end of an optical fiber held in the coupling socket;
at least one radio frequency identification (RFID) tag;
an RFID reader operable to interrogate each of the at least one RFID tag;
a controller configured to control the RFID reader to interrogate an RFID tag of the at least one RFID tag to identify an optical end connector in the first array and/or a coupling socket in the second array.

2. The apparatus according to claim 1 wherein an RFID of the at least one RFID is mounted to the holding socket of the SMU.

3. The apparatus according to claim 1 wherein each coupling socket in the second array is mounted to an SMU of the SMUs in the first array.

4. The apparatus according to claim 3 wherein an RFID of the at least one RFID is mounted to the coupling socket.

5. The apparatus according to claim 1 wherein the optical end connector of an optical fiber held by an SMU in the first array is mounted with an RFID of the at least one RFID.

6. The apparatus according to claim 1 wherein the reader is mounted to the grabber and/or component of the grabber.

7. The apparatus according to claim 1 wherein the at least one RFID comprises a plurality of RFIDs that are configured to respond to an interrogation signal from the RFID reader with different response times to prevent temporal overlap of response signals generated by different RFID tags to a same interrogation signal.

8. The apparatus according to claim 1 wherein the controller comprises a memory that stores a connectivity map of current connections between optical fibers of optical end connectors held by holding sockets in the first array and optical fibers having optical ends coupled to coupling sockets in the second array.

9. The apparatus according to claim 8 wherein the controller controls the RFID reader to scan the at least one RFID to determine the connectivity map.

10. The apparatus according to claim 8 wherein the controller controls the RFID reader to scan the at least one RFID to determine if the connectivity map stored in the controller memory conforms with an actual connectivity configuration between the optical fibers, to refresh the connectivity map, and/or to restore the map in the event of a loss or corruption of data in the map.

11. The apparatus according to claim 1 wherein the controller controls the RFID reader to interrogate an RFID tag to determine if a connection that the grabber is controlled to establish is an intended connection.

\* \* \* \* \*